(12) United States Patent
Chiu

(10) Patent No.: US 11,899,776 B2
(45) Date of Patent: Feb. 13, 2024

(54) ELECTRONIC DEVICE AND METHOD FOR AUTHENTICATING SOFTWARE BASED ON BLOCKCHAIN

(71) Applicant: HON HAI PRECISION INDUSTRY CO., LTD., New Taipei (TW)

(72) Inventor: Liang-Te Chiu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 374 days.

(21) Appl. No.: 17/393,542

(22) Filed: Aug. 4, 2021

(65) Prior Publication Data
US 2022/0043899 A1 Feb. 10, 2022

(30) Foreign Application Priority Data
Aug. 4, 2020 (CN) .......................... 202010773973.4

(51) Int. Cl.
*H04L 29/06* (2006.01)
*G06F 21/44* (2013.01)
*H04L 9/32* (2006.01)
*H04L 9/00* (2022.01)

(52) U.S. Cl.
CPC ............ *G06F 21/44* (2013.01); *H04L 9/3236* (2013.01); *H04L 9/50* (2022.05)

(58) Field of Classification Search
CPC .......... G06F 21/44; G06F 21/10; G06F 21/64; H04L 9/3236; H04L 9/50; H04L 9/3247; H04L 9/0643
See application file for complete search history.

(56) References Cited

U.S. PATENT DOCUMENTS

| 2005/0033983 | A1* | 2/2005 | Takekawa | G06F 21/31 726/2 |
| 2013/0159719 | A1* | 6/2013 | Ha | G06F 21/51 713/176 |
| 2013/0305394 | A1* | 11/2013 | Nozue | G06F 21/10 726/30 |
| 2014/0223580 | A1* | 8/2014 | Neivanov | G06F 21/31 726/28 |
| 2014/0281501 | A1* | 9/2014 | Korkishko | H04L 63/123 713/156 |

(Continued)

FOREIGN PATENT DOCUMENTS

| KR | 10-1979323 | 5/2019 |
| WO | 02/15998 | 2/2002 |

*Primary Examiner* — Yogesh Paliwal
(74) *Attorney, Agent, or Firm* — ScienBiziP, P.C.

(57) ABSTRACT

A method for authenticating a software based on a blockchain implemented in an electronic device. The method includes obtaining a first identification code and a first hash value of a first software; generating a first authentication code; writing the first identification code, the first hash value, and the first authentication code into a blockchain; obtaining a second identification code of a second software to be identified and calculating a second hash value of the second software; determining whether the second hash value of the second software is the same as the first hash value; if the second hash value is the same as the first hash value, generating a second authentication code; determine whether the second authentication code is the same as the first authentication code; and if so determining that the second software is copyrighted.

16 Claims, 4 Drawing Sheets

(56) References Cited

U.S. PATENT DOCUMENTS

| | | | | |
|---|---|---|---|---|
| 2015/0312256 | A1* | 10/2015 | Seibert, Jr. | H04L 63/102 726/8 |
| 2020/0334032 | A1* | 10/2020 | Smith | G06F 21/64 |

* cited by examiner

ELECTRONIC DEVICE AND METHOD FOR AUTHENTICATING SOFTWARE BASED ON BLOCKCHAIN

CROSS-REFERENCE TO RELATED APPLICATIONS

This application claims priority to Chinese Patent Application No. 202010773973.4 filed on Aug. 4, 2020, the contents of which are incorporated by reference herein.

FIELD

The subject matter herein generally relates to blockchain, and particularly to an electronic device and a method for authenticating software based on blockchain.

BACKGROUND

Block chains serves as shared databases, having features of decentralization, cannot be forged, and are easily traceable. The block chains are used for recording important and confidential information. Many software companies record important and confidential information, such as unique identification codes, and hash values of their developed software, on a blockchain. Important and confidential information on the blockchain can identify whether a software is copyrighted. However, unauthorized persons or companies may obtain the hash value through the copyrighted software, and write the information of an uncopyrighted software into the block chain using counterfeit unique identification codes, so that the uncopyrighted software can also be portrayed as valid, thereby causing great loss to the software company that has developed the software.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the presented disclosure.

The presented disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

Figure 1:
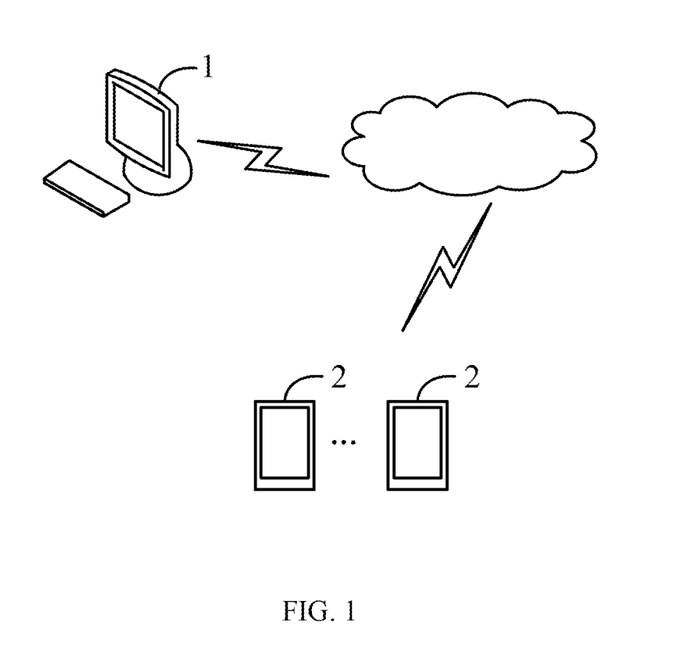
FIG. 1 is a schematic view of an embodiment of an application environment of an electronic device according to the present disclosure.

Referring to FIG. 1, an electronic device (electronic device 1) communicates with at least one terminal device 2 through a network. In one embodiment, the network can be wired network or wireless network. The wireless network can be radio, WI-FI, cellular, satellite, broadcast, etc.

In one embodiment, the electronic device 1 can be a personal computer, a server, and the like, the server can be a single server, a server cluster, or a cloud server. The terminal device 2 can be a smart phone or a personal computer.

Figure 2:
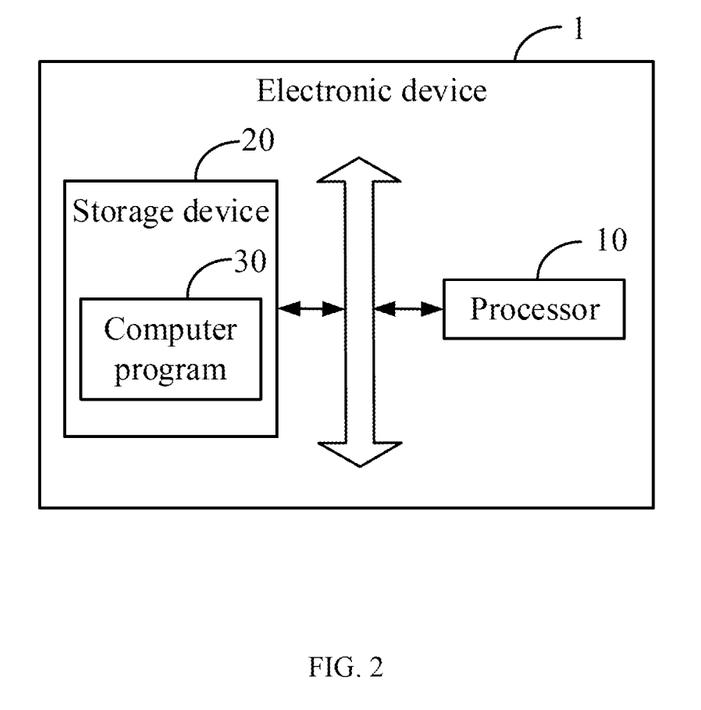
FIG. 2 is a block diagram of an embodiment of an electronic device according to the present disclosure.

FIG. 2 illustrates the electronic device 1 in one embodiment. The electronic device 1 includes, but is not limited to, a processor 10, a storage device 20, and a computer program 30. The processor 10 can execute the computer program 30 to implement athemethod for authenticating software based on a blockchain. FIG. 2 illustrates only one example of the electronic device 1. Other examples can include more or fewer components than as illustrated or have a different configuration of the various components in other embodiments.

The processor 10 can be a central processing unit (CPU), a microprocessor, or other data processor chip that performs functions in the electronic device 1.

In one embodiment, the storage device 20 can include various types of non-transitory computer-readable storage mediums. For example, the storage device 20 can be an internal storage system, such as a flash memory, a random access memory (RAM) for the temporary storage of information, and/or a read-only memory (ROM) for permanent storage of information. The storage device 20 can also be an external storage system, such as a hard disk, a storage card, or a data storage medium.

Figure 3:
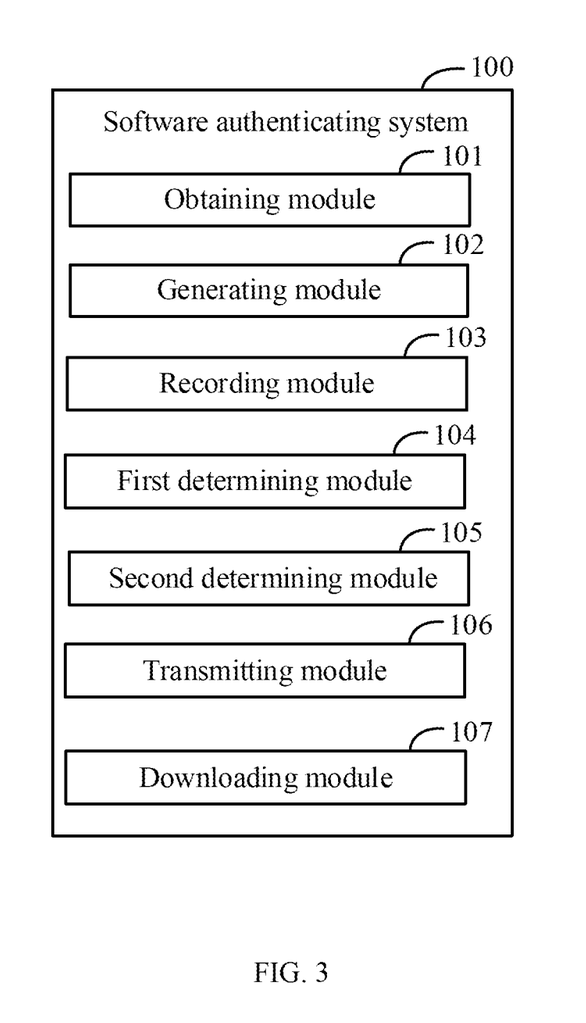
FIG. 3 is a block diagram of an embodiment of a software authenticating system according to the present disclosure.

As illustrated in FIG. 3, the electronic device 1 runs a software authenticating system 100. The software authenticating 100 at least includes an obtaining module 101, a generating module 102, a recording module 103, a first determining module 104, a second determining module 105, a transmitting module 106, and a downloading module 107. The modules 101-107 can be collections of software instructions stored in the storage device 20 of the electronic device 1 and executed by the processor 10. The modules 101-107 also can include functionality represented by hardware or integrated circuits, or by software and hardware combinations, such as a special-purpose processor or a general-purpose processor with special-purpose firmware.

The obtaining module 101 is configured to obtain a first identification code and a first hash value of a first software.

In one embodiment, the first software can be a software product or program developed and copyrighted by a developer. The first identification code can be a unique identification code of the first software, and the first hash value is calculated by performing a hash algorithm on program files of the first software. The hash algorithm can be a direct addressing method, a digital analysis method, a middle-square method, a folding method, or a random number method. The first identification code and the first hash value are both hexadecimal numbers.

The generating module 102 is configured to generate a first authentication code by performing an encryption operation on the first identification code and the first hash value.

In one embodiment, the encryption operation can be an exclusive OR operation. The generating module 102 performs the exclusive OR operation on the first identification code and the first hash value to generate the first authentication code. For example, if the first identification code ID1 is 0x123456, the first hash value Hash1 is 0x0d0d0d, and the exclusive OR operation function is XOR, the first authentication code CK1=(ID1)XOR(Hash1)=0x1f395b.

In other embodiments, the encryption operation includes adding two values and taking last 16 bits of a sum of the two values, that is, the generating module 102 adds the first identification code and the first hash value, and then takes the last 16 bits of a sum of the first identification code and the first hash value to generate the first authentication code. For example, if the first identification code ID1 is 0x123456 and the first hash value Hash1 is 0x0d0d0d, the first authentication code CK1=[(ID1)+(Hash1)]&0xffff=0x4163.

In one embodiment, the generating module 102 further encodes the encryption operation into a two-dimensional code algorithm, and performs the two-dimensional code algorithm on the first identification code and the first hash value, to generate the first authentication code, thereby establishing an association between the unique identification code and the hash value of the first software, so as to increase difficulty of breaking the identification code, and further increase difficulty of breaking the first software. In one embodiment, the first identification code can be a two-dimensional code.

The recording module 103 is configured to write the first identification code, the first hash value, and the first authentication code into a blockchain as authentication information of the first software.

In one embodiment, the recording module 103 calculates a transaction hash value of the authentication information, that is, re-applies a hash algorithm on the first identification code, the first hash value, and the first authentication code to calculate the transaction hash value. The recording module 103 further packages the authentication information and the transaction hash value into a transaction block, and writes the transaction block into the blockchain according to an intelligent contact. The block where the identification information is located includes a transaction hash value of a previous written block, the transaction hash value calculated by the recording module 103, and a transaction record.

The obtaining module 101 is further configured to obtain a second identification code of a second software to be authenticated, and calculate a second hash value of the second software.

In one embodiment, when the user downloads the second software through the terminal device 2, the obtaining module 101 determines that the second software is a software product or program to be authenticated, obtains the second identification code of the second software, and calculates the second hash value of the second software. In one embodiment, the second software to be downloaded by the user can be published on a network platform such as a website or an application market by a person other than the developer, and the name and function of the second software are the same as the first software developed by the developer.

When the terminal device 2 requests a download of the second software, the terminal device 2 reads the name of the second software. If the name of the second software is the same as the name of the first software, the terminal device 2 transmits a request for authentication to the electronic device 1. When the electronic device 1 receives the authentication request, the obtaining module 101 obtains program files of the second software from the terminal device 2. When the terminal device 2 requests the download of the second software, the terminal device 2 can temporarily download the program files of the second software from a server storing the second software.

The obtaining module 101 calculates the second hash value of the second software according to the hash algorithm used in calculating the first hash value and the obtained program files of the second software.

The first determining module 104 is configured to determine whether the second hash value of the second software is the same as the first hash value.

In one embodiment, the second identification code of the second software may be counterfeit or authorized to be the same as the first identification code. The first determining module 104 can obtain the transaction record corresponding to the first identification code, which is the same as the second identification code from the blockchain. The transaction record includes the first identification code, the first hash value, and the first authentication code. The determining module 104 further determines whether the second hash value is the same as the first hash value.

In other embodiments, the first determining module 104 determines whether any transaction record corresponding to the second identification code is recorded in the blockchain. If the first determining module 104 determines that there is no transaction record corresponding to the second identification code being recorded in the blockchain, the first determining module 104 determines that the second software is uncopyrighted. If the first determining module 104 determines that there is at least one transaction record corresponding to the second identification code being recorded in the blockchain, the first determining module 104 determines whether the second hash value is the same as the first hash value.

If the first determining module 104 determines that the second hash value of the second software is the same as the first hash value, the generating module 102 further generates a second authentication code by performing the encryption operation on the second identification code and the second hash value.

It should be noted that, the encryption operation for generating the second authentication code is the same as the encryption operation for generating the first authentication code. In one embodiment, the second authentication code can also be a two-dimensional code.

The first determining module 104 further determines whether the second authentication code is the same as the first authentication code.

If the first determining module 104 determines that the second authentication code is the same as the first authentication code, the second determining module 105 is configured to determine that the second software is copyrighted.

In one embodiment, if the first determining module 104 determines that the second authentication code is the same as the first authentication code, an association between the second identification code and the hash value of the second software is the same as the association between the first identification code and the hash value of the first software, the second software is thus determined to be copyrighted.

If the first determining module 104 determines that the second hash value of the second software is different from the first hash value, or determines that the second authentication code is different from the first authentication code, the second determining module 105 further determines that the second software is uncopyrighted.

If the second determining module 105 determines that the second software is uncopyrighted, the transmitting module 106 is configured to issue alarm to the developer of the first software.

In one embodiment, the transmitting module 106 issues the alarm to a mailbox of a designated person of the developer. The information in the alarm at least includes a network bit address of the second software, publisher information, and text information confirming that the second software is uncopyrighted. In other embodiments, the transmitting module 106 can also notify the developer of the alarm by telephone.

If the determining module 105 determines that the second software is copyrighted, the downloading module 107 is configured to transmit a download instruction to the terminal device 2, so as to allow the second software to be stored into the terminal device 2.

Figure 4:
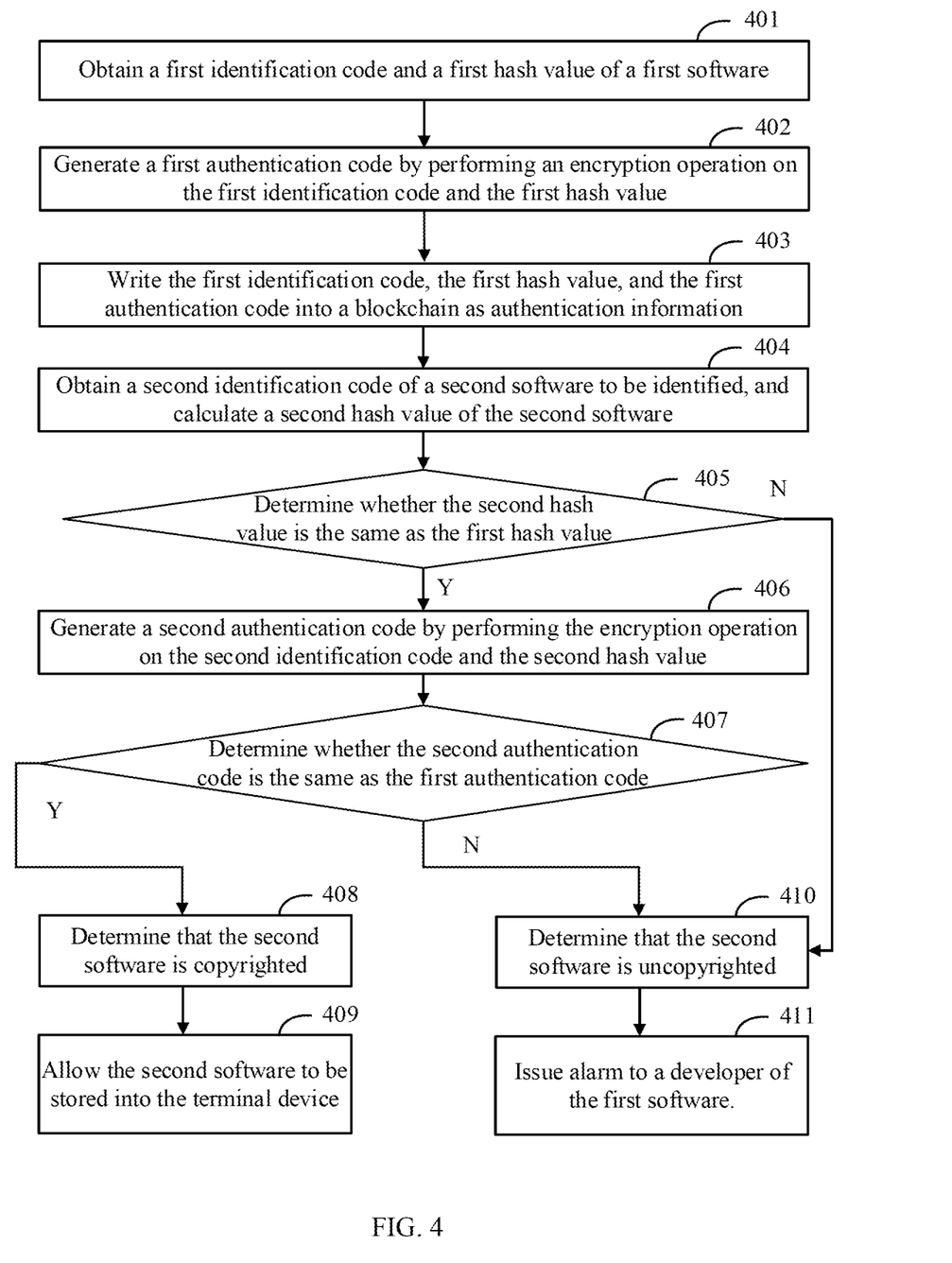
FIG. 4 illustrates a flowchart of an embodiment of a method for authenticating a software based on a blockchain according to the present disclosure.

FIG. 4 illustrates a flowchart of an embodiment of a method for authenticating a software based on a blockchain. The method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 401.

At block 401, the obtaining module 101 obtains a first identification code and a first hash value of a first software.

In one embodiment, the first software can be a software product or program developed and copyrighted by a developer. The first identification code can be a unique identification code of the first software, and the first hash value is calculated by performing a hash algorithm on program files of the first software. The hash algorithm can be a direct addressing method, a digital analysis method, a middle-square method, a folding method, or a random number method. The first identification code and the first hash value are both hexadecimal numbers.

At block 402, the generating module 102 generates a first authentication code by performing an encryption operation on the first identification code and the first hash value.

In one embodiment, the encryption operation can be an exclusive OR operation. The generating module 102 performs the exclusive OR operation on the first identification code and the first hash value to generate the first authentication code. For example, if the first identification code ID1 is 0x123456, the first hash value Hash1 is 0x0d0d0d, and the exclusive OR operation function is XOR, the first authentication code CK1=(ID1)XOR(Hash1)=0x1f395b.

In other embodiments, the encryption operation includes adding two values and taking last 16 bits of a sum of the two values, that is, the generating module 102 adds the first identification code and the first hash value, and then takes the last 16 bits of a sum of the first identification code and the first hash value to generate the first authentication code. For example, if the first identification code ID1 is 0x123456 and the first hash value Hash1 is 0x0d0d0d, the first authentication code CK1=[(ID1)+(Hash1)]&0xffff=0x4163.

In one embodiment, the generating module 102 further adds the encryption operation into a two-dimensional code algorithm, and performs the two-dimensional code algorithm on the first identification code and the first hash value, to generate the first authentication code, thereby establishing an association between the unique identification code and the hash value of the first software, so as to increase difficulty of breaking the identification code, and further increase difficulty of breaking the first software. In one embodiment, the first identification code can be a two-dimensional code.

At block 403, the recording module 103 writes the first identification code, the first hash value, and the first authentication code into a blockchain as authentication information of the first software.

In one embodiment, the recording module 103 calculates a transaction hash value of the authentication information, that is, re-applies a hash algorithm on the first identification code, the first hash value, and the first authentication code to calculate the transaction hash value. The recording module 103 further packages the authentication information and the transaction hash value into a transaction record, and writes the transaction record into the blockchain according to an intelligent contact. The block where the identification information is located includes a transaction hash value of a previous written block, the transaction hash value calculated by the recording module 103, and a transaction record.

At block 404, the obtaining module 101 further obtains a second identification code of a second software to be authenticated, and calculate a second hash value of the second software.

In one embodiment, when the user downloads the second software through the terminal device 2, the obtaining module 101 determines that the second software is a software product or program to be authenticated, obtains the second identification code of the second software, and calculates the second hash value of the second software. In one embodiment, the second software to be downloaded by the user can be published on a network platform such as a website or an application market by a person other than the developer, and the name and function of the second software are the same as the first software developed by the developer.

When the terminal device 2 requests a download of the second software, the terminal device 2 reads the name of the second software. If the name of the second software is the same as the name of the first software, the terminal device 2 transmits a request for authentication to the electronic device 1. When the electronic device 1 receives the authentication request, the obtaining module 101 obtains program files of the second software from the terminal device 2. When the terminal device 2 requests a download of the second software, the terminal device 2 can temporarily download the program files of the second software from a server storing the second software.

The obtaining module 101 calculates the second hash value of the second software according to the hash algorithm used in calculating the first hash value and the obtained program files of the second software.

At block 405, the first determining module 104 determines whether the second hash value of the second software is the same as the first hash value. If the first determining module 104 determines that the second hash value of the second software is the same as the first hash value, the process goes to block 406. If the first determining module 104 determines that the second hash value of the second software is not the same as the first hash value, the process goes to block 410.

In one embodiment, the second identification code of the second software may be counterfeit or authorized to be the same as the first identification code. The first determining module 104 can obtain the transaction record corresponding to the first identification code, which is the same as the second identification code from the blockchain. The transaction record includes the first identification code, the first hash value, and the first authentication code. The determining module 104 further determines whether the second hash value is the same as the first hash value.

In other embodiments, the first determining module 104 determines whether any transaction record corresponding to the second identification code is recorded in the blockchain. If the first determining module 104 determines that there is no transaction record corresponding to the second identification code being recorded in the blockchain, the first determining module 104 determines that the second software is uncopyrighted. If the first determining module 104 determines that there is at least one transaction record corresponding to the second identification code being recorded in the blockchain, the first determining module 104 determines whether the second hash value is the same as the first hash value.

At block 406, the generating module 102 further generates a second authentication code by performing the encryption operation on the second identification code and the second hash value.

It should be noted that, the encryption operation for generating the second authentication code is the same as the encryption operation for generating the first authentication code. In one embodiment, the second authentication code can also be a two-dimensional code.

At block 407, the first determining module 104 further determines whether the second authentication code is the same as the first authentication code. If the first determining module 104 determines that the second authentication code is the same as the first authentication code, the process goes to block 408. If the first determining module 104 determines that the second authentication code is not the same as the first authentication code, the process goes to block 410.

At block 408, the second determining module 105 determines that the second software is copyrighted.

At block 409, the downloading module 107 transmits a download instruction to the terminal device 2, so as to allow the second software to be stored into the terminal device 2.

At block 410, the second determining module 105 determines that the second software is uncopyrighted.

At block 411, the transmitting module 106 issues alarm to the developer of the first software.

In one embodiment, the transmitting module 106 issues the alarm to a mailbox of a designated person of the developer. The information in the alarm at least includes a network bit address of the second software, publisher information, and text information confirming that the second software is uncopyrighted. In other embodiments, the transmitting module 106 can also notify the developer of the alarm by telephone.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:
   at least one processor; and
   a storage device coupled to the at least one processor and storing instructions for execution by the at least one processor to cause the at least one processor to:
   obtain a first identification code and a first hash value of a first software;
   generate a first authentication code by performing an encryption operation on the first identification code and the first hash value;
   write the first identification code, the first hash value, and the first authentication code into a blockchain as authentication information of the first software;
   obtain a second identification code of a second software to be authenticated and calculate a second hash value of the second software;
   determine whether the second hash value of the second software is the same as the first hash value;
   generate, in response that the second hash value of the second software is determined to be the same as the first hash value, a second authentication code by performing the encryption operation on the second identification code and the second hash value;
   determine whether the second authentication code is the same as the first authentication code; and
   determine, in response that the second authentication code is determined to be the same as the first authentication code, that the second software is copyrighted.

2. The electronic device according to claim 1, wherein the at least processor is further caused to:
   determine, in response that the second hash value of the second software is determined to be not the same as the first hash value or the second authentication code is determined to be not the same as the first authentication code, that the second software is uncopyrighted.

3. The electronic device according to claim 2, wherein the at least one processor is further caused to:
   issue, in response that the second software is determined to be uncopyrighted, alarm to a developer of the first software.

4. The electronic device according to claim 1, wherein the at least one processor is further caused to:
   generate the first authentication code by performing an exclusive OR operation on the first identification code and the first hash value.

5. The electronic device according to claim 1, wherein the at least one processor is further caused to:

generate the first authentication code by adding the first identification code and the first hash value and taking last 16 bits of a sum of the first identification code and the first hash value.

6. The electronic device according to claim 1, wherein the at least one processor is further caused to:
add the encryption operation into a two-dimensional code algorithm; and
generate the first authentication code by performing the two-dimensional code algorithm on the first identification code and the first hash value.

7. The electronic device according to claim 1, wherein the at least one processor is further caused to:
calculate a transaction hash value of the authentication information;
package the authentication information and the transaction hash value into a transaction block; and
write the transaction block into the blockchain.

8. The electronic device according to claim 1, wherein the at least one processor is further caused to:
transmit, in response that a terminal device request a download of the second software and the second software is determined to be copyrighted, a download instruction to the terminal device, so as to allow the second software to be stored into the terminal device.

9. A method for authenticating a software based on a blockchain implemented in an electronic device comprising:
obtaining a first identification code and a first hash value of a first software;
generating a first authentication code by performing an encryption operation on the first identification code and the first hash value;
writing the first identification code, the first hash value, and the first authentication code into a blockchain as authentication information of the first software;
obtaining a second identification code of a second software to be authenticated and calculating a second hash value of the second software;
determining whether the second hash value of the second software is the same as the first hash value;
generating, in response that the second hash value of the second software is determined to be the same as the first hash value, a second authentication code by performing the encryption operation on the second identification code and the second hash value;
determine whether the second authentication code is the same as the first authentication code; and
determine, in response that the second authentication code is determined to be the same as the first authentication code, that the second software is copyrighted.

10. The method according to claim 9, further comprising:
determining, in response that the second hash value of the second software is determined to be not the same as the first hash value or the second authentication code is determined to be not the same as the first authentication code, that the second software is uncopyrighted.

11. The method according to claim 10, further comprising: issuing, in response that the second software is determined to be uncopyrighted, alarm to a developer of the first software.

12. The method according to claim 9, wherein a method of generating a first authentication code by performing an encryption operation on the first identification code and the first hash value comprises:
generating the first authentication code by performing an exclusive OR operation on the first identification code and the first hash value.

13. The method according to claim 9, wherein a method of generating a first authentication code by performing an encryption operation on the first identification code and the first hash value comprises:
generating the first authentication code by adding the first identification code and the first hash value and taking last 16 bits of a sum of the first identification code and the first hash value.

14. The method according to claim 9, further comprising:
adding the encryption operation into a two-dimensional code algorithm; and
generating the first authentication code by performing the two-dimensional code algorithm on the first identification code and the first hash value.

15. The method according to claim 14, wherein a method of writing the first identification code, the first hash value, and the first authentication code into a blockchain as authentication information of the first software comprise:
calculating a transaction hash value of the authentication information;
packaging the authentication information and the transaction hash value into a transaction block; and
writing the transaction block into the blockchain.

16. The method according to claim 9, further comprising:
transmitting, in response that a terminal device request a download of the second software and the second software is determined to be copyrighted, a download instruction to the terminal device, so as to allow the second software to be stored into the terminal device.

* * * * *